United States Patent
Deel

(10) Patent No.: US 10,935,022 B2
(45) Date of Patent: Mar. 2, 2021

(54) PREDICTING MUD PUMP EXPENDABLE LIFE BASED ON PSI-MILES

(71) Applicant: Nabors Drilling Technologies USA, Inc., Houston, TX (US)

(72) Inventor: Steve Deel, Cypress, TX (US)

(73) Assignee: NABORS DRILLING TECHNOLOGIES USA, INC., Houston, TX (US)

(*) Notice: Subject to any disclaimer, the term of this patent is extended or adjusted under 35 U.S.C. 154(b) by 550 days.

(21) Appl. No.: 15/986,310

(22) Filed: May 22, 2018

(65) Prior Publication Data

US 2018/0355862 A1  Dec. 13, 2018

Related U.S. Application Data

(60) Provisional application No. 62/518,945, filed on Jun. 13, 2017.

(51) Int. Cl.
*G01C 9/00* (2006.01)
*F04B 51/00* (2006.01)
*G01L 9/04* (2006.01)
*F04B 19/22* (2006.01)
*F04B 49/08* (2006.01)
*F04B 15/02* (2006.01)

(52) U.S. Cl.
CPC .............. *F04B 51/00* (2013.01); *F04B 15/02* (2013.01); *F04B 19/22* (2013.01); *F04B 49/08* (2013.01); *G01L 9/04* (2013.01)

(58) Field of Classification Search
CPC ....................................................... F04B 51/00
USPC ............................................................ 702/50
See application file for complete search history.

(56) References Cited

U.S. PATENT DOCUMENTS

| | | | | |
|---|---|---|---|---|
| 6,102,673 A | * | 8/2000 | Mott | ....................... E21B 21/01 417/392 |
| 2010/0329905 A1 | * | 12/2010 | Williams | ................ E21B 21/08 417/410.1 |

* cited by examiner

*Primary Examiner* — Aditya S Bhat
(74) *Attorney, Agent, or Firm* — Adolph Locklar

(57) ABSTRACT

A method of determining mud pump operational lifespan expended includes operating the mud pump. While operating, a cycle rate of a crankshaft of the mud pump and a discharge pressure are measured. From the cycle rate and discharge pressure, the amount of mud pump operational lifespan expended may be determined.

14 Claims, 6 Drawing Sheets

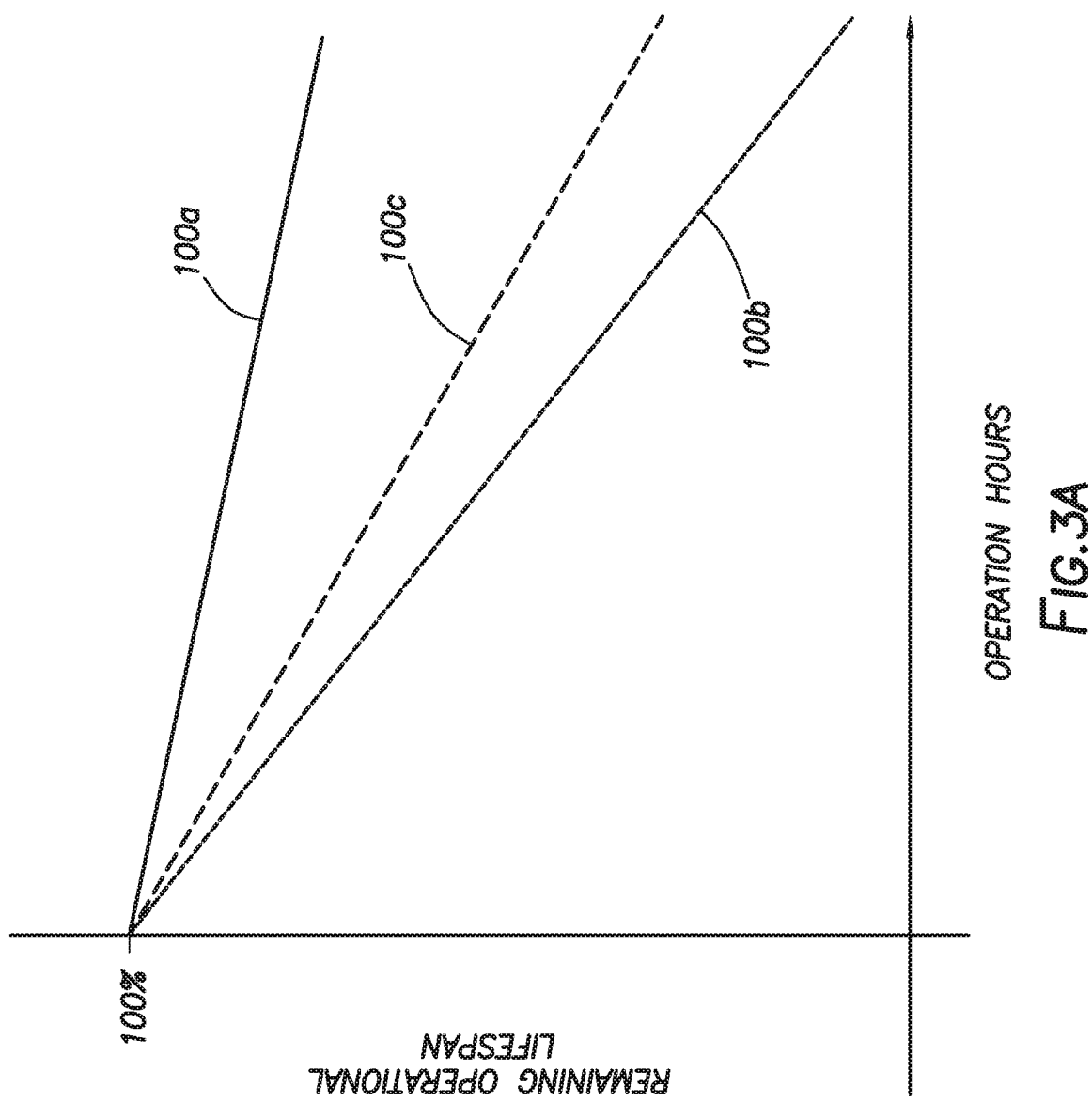

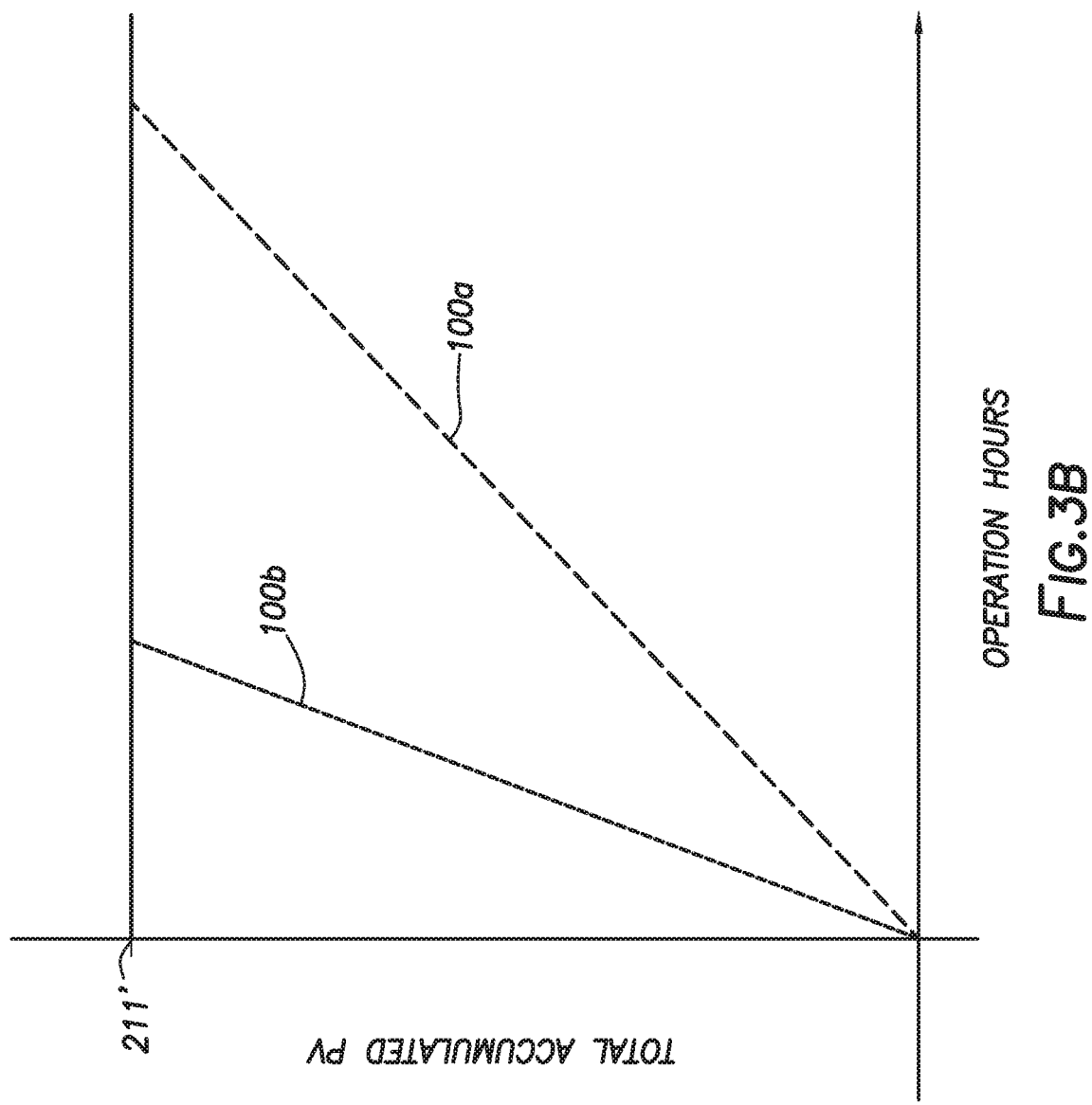

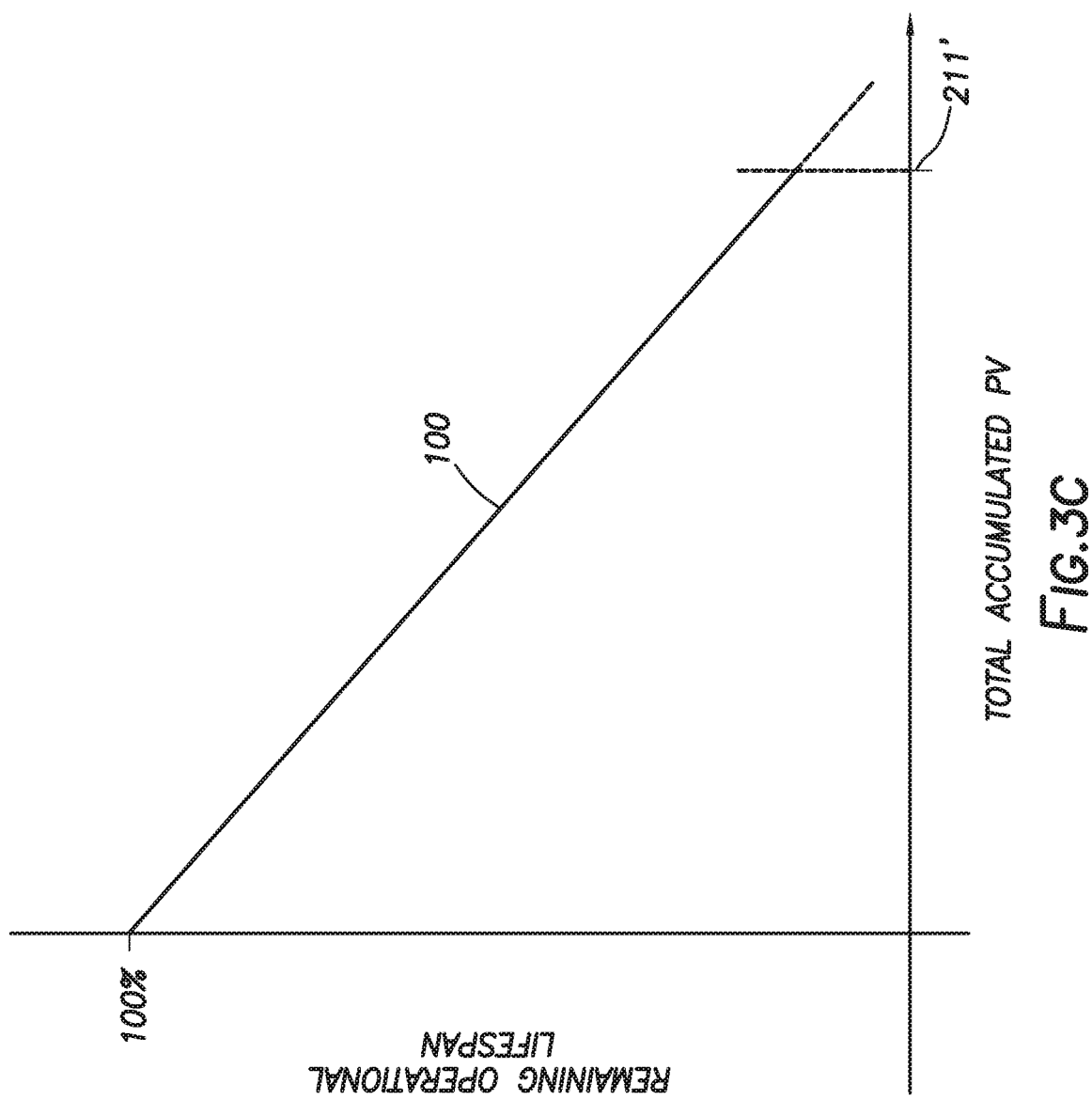

PREDICTING MUD PUMP EXPENDABLE LIFE BASED ON PSI-MILES

CROSS-REFERENCE TO RELATED APPLICATIONS

This application is a non-provisional application which claims priority from U.S. provisional application number 62/518,945, filed Jun. 13, 2017, which is incorporated by reference herein in its entirety.

TECHNICAL FIELD/FIELD OF THE DISCLOSURE

The present disclosure relates generally to drilling rig equipment and methods of use of a mud pump.

BACKGROUND OF THE DISCLOSURE

During a drilling operation, fluids are circulated through the drill string from the surface to cool and lubricate the drill bit and flush out cuttings and other matter from the wellbore. The fluids are typically circulated by a mud pump at the surface. On a reciprocating pump such as a mud pump used for oil and gas drilling, elastomeric pistons are fitted to a rod column that is driven by the rotating crankshaft. The pistons operate inside a tubular shell known as a liner. During operation, the piston is driven forward and backward inside the liner in a reciprocating motion. As a result of the fluid tight seal formed between the outside diameter of the piston and the inside diameter of the liner, fluid within the liner is pressurized and pumped out of the mud pump.

Due to the fluid tight seal of the piston to liner, friction exists between the outside diameter of the piston and the inside diameter of the liner. Through continued use, this friction results in wear of the piston and the liner until the piston can no longer effect a fluid tight seal. In the absence of the fluid tight seal, the pumping media exits the pump across the piston upon which pressure is lost and the mud pump is removed from service for refurbishment. Refurbishment, as used herein, may include the replacement of any component of a mud pump.

Mud pump removal from service can result in downtime for the drilling rig which in turn causes loss of revenue as the time spent repairing the pump is typically covered by the drilling contractor. Further time is required to clean the equipment as the failure of the piston and or liner will often result in the equipment being sprayed/covered with the drilling fluid. Mud pump operational lifespan, as used herein, refers to the amount a mud pump may be in operation before failure is expected or a repair or refurbishment is to be undertaken.

SUMMARY

A method is disclosed. The method includes operating a mud pump and measuring a cycle rate of a crankshaft of the mud pump. The method also includes measuring a discharge pressure of the mud pump and calculating a total pressure-distance value based on the cycle rate and pressure. In addition, the method includes comparing the total pressure-distance value with a predetermined threshold pressure-distance value and refurbishing the mud pump.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 3A is a chart depicting mud pump operational lifespan remaining for mud pumps as calculated according to at least one embodiment of the present disclosure.

FIG. 3B is a chart depicting total accumulated PV for mud pumps as calculated according to at least one embodiment of the present disclosure.

FIG. 3C is a chart depicting total accumulated PV for a mud pump vs. the remaining operational lifespan of the mud pump as calculated according to at least one embodiment of the present disclosure.

DETAILED DESCRIPTION

Figure 1:
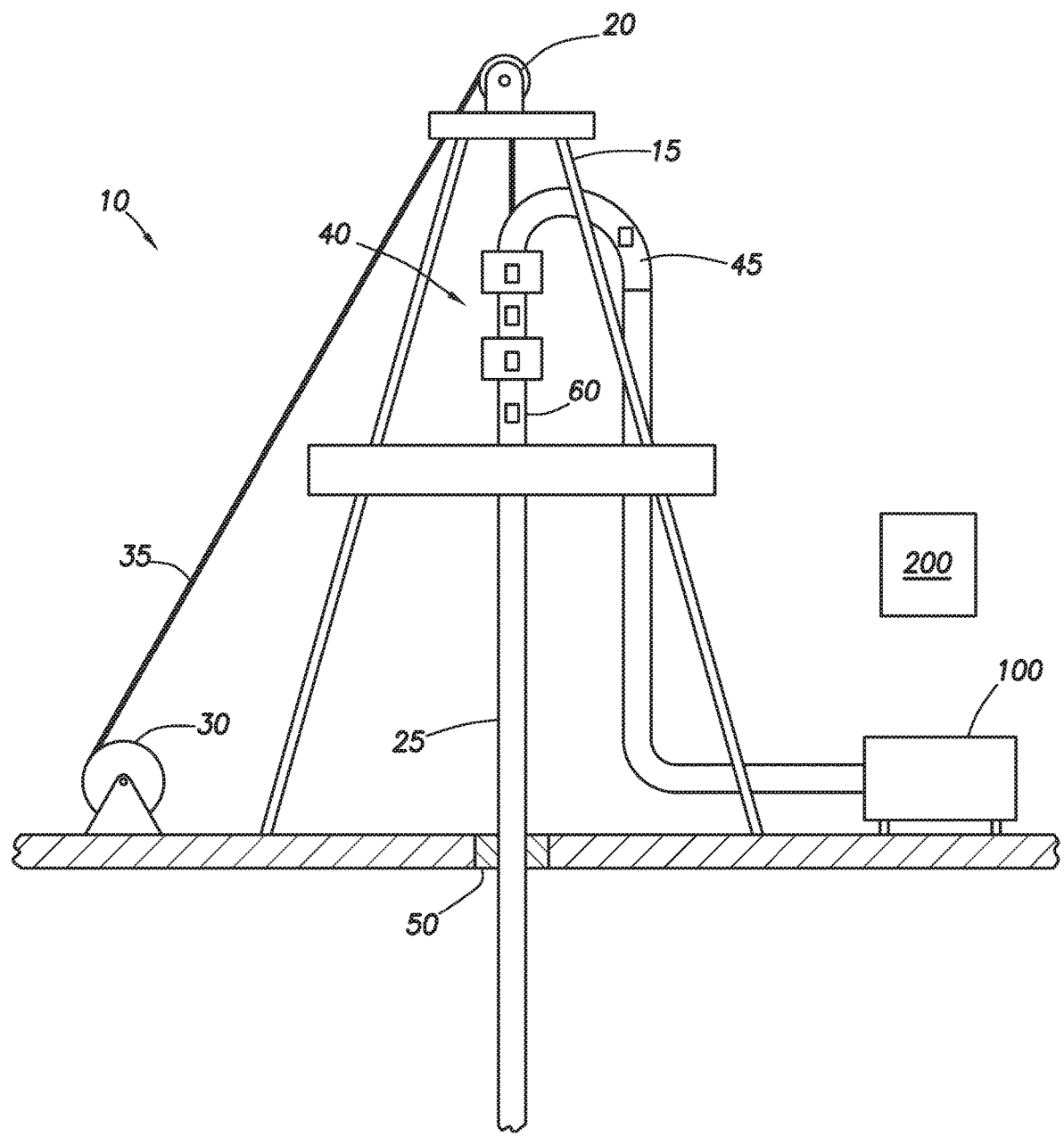
FIG. 1 depicts an overview of a drilling rig utilizing a mud pump assembly consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts an overview of drilling rig 10. Drilling rig 10 may include derrick 15. Derrick 15 may serve to support crown block 20, which is used to hoist drill string 25. Drill string 25 may be hoisted by, for example and without limitation, drawworks 30 by line 35. Drilling rig 10 may further include mud pump 100. Mud pump 100 may pump drilling fluid through gooseneck 45, which is fluidly coupled to drill string 25 by washpipe assembly 40. Drill string 25 may be rotated by a top drive or may be rotated by rotary table 50. The upper end of drill string 25 may include a kelly pipe, may be the upper end of the topmost pipe stand of drill string 25, or may be a transfer pipe extending from a top drive. The uppermost rotating portion mechanically coupled to drill string 25 is referred to herein as drill stem 60.

Figure 2:
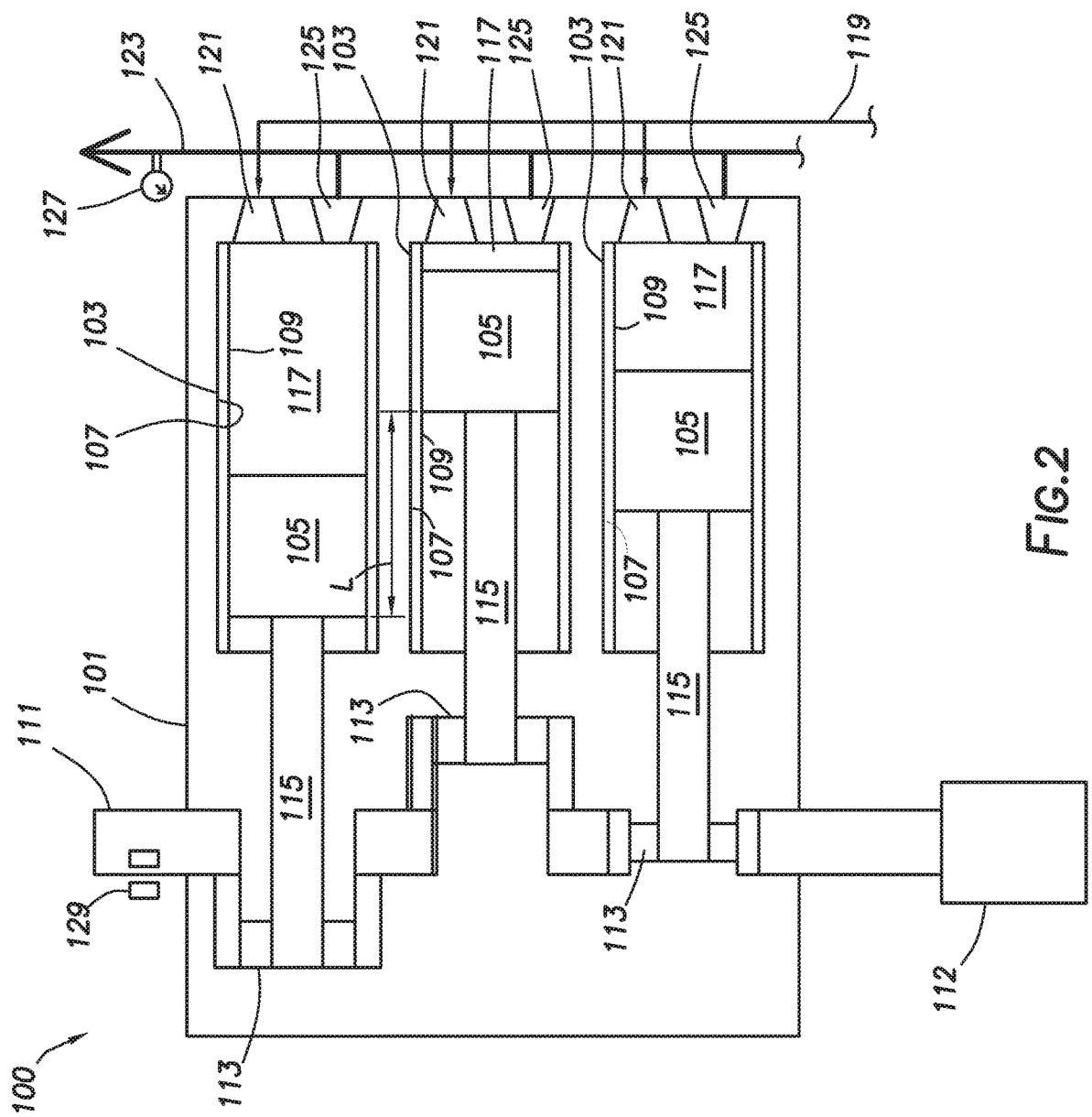
FIG. 2 depicts a partial cross section view of a mud pump consistent with at least one embodiment of the present disclosure.

Mud pump 100, as depicted in FIG. 2, may include mud pump housing 101. Mud pump housing 101 may include one or more cylinders 103, each positioned to receive piston 105. In some embodiments, each cylinder 103 may include liner 109 positioned between inner surface 107 of each cylinder 103 and piston 105. In some embodiments, piston 105 may be formed from a polymer such as an elastomer. In some embodiments, liner 109 may be formed from a metal such as steel. In some embodiments, liner 109 may include an inner sleeve made of, for example and without limitation, chrome iron or ceramic. Each of pistons 105 and corresponding liner 109 may form a fluid seal. In some embodiments, pistons 105 may be driven in a reciprocating motion within the respective liner 109 by rotation of crankshaft 111. Crankshaft 111 may rotate concentrically within mud pump housing 101. Crankshaft 111 may include connecting rod journals 113 corresponding to each piston 105. Each connecting rod journal 113 may be offset from the axis of rotation of crankshaft 111. Each piston 105 may be mechanically coupled to crankshaft 111 by connecting rod 115. Connecting rod 115 may translate eccentric rotation of a corresponding connecting rod journal 113 part of crankshaft 111 to a linear reciprocating motion of the corresponding piston 105. Crankshaft 111 may be driven by motor 112, which may be, for example and without limitation, an electric motor, gasoline motor, or any other rotational input.

Each piston 105 may define a corresponding pumping chamber 117 within cylinder 103. Pumping chamber 117 may be fluidly coupled to fluid inlet 119 through suction valve 121 and fluid outlet 123 through discharge valve 125. Suction valve 121 and discharge valve 125 may be check valves positioned to allow fluid flow into pumping chamber 117 from fluid inlet 119 and fluid flow out of pumping chamber 117 to fluid outlet 123. As piston 105 reciprocates within cylinder 103, the volume of pumping chamber 117 repeatedly increases and decreases. As pumping chamber 117 increases in volume, fluid enters pumping chamber 117 through suction valve 121 from fluid inlet 119. As pumping chamber 117 decreases in volume, fluid leaves pumping chamber 117 through discharge valve 125 to fluid outlet 123. Continued operation of mud pump 100 therefore causes fluid to be pumped from fluid inlet 119 to fluid outlet 123.

In some embodiments, the distance that each piston 105 reciprocates defines a stroke length L. With a full rotation of crankshaft 111, each piston 105 travels two stroke lengths, defining a piston cycle distance.

In some embodiments, a pressure transducer 127 may be fluidly coupled to fluid outlet 123 to measure the pressure of fluid discharged from mud pump 100. In other embodiments, the discharge pressure may be measured using strain gauges or any other suitable pressure measurement systems.

In some embodiments, the cycle rate of crankshaft 111, and therefore the average velocity of each piston 105 during pumping, may be determined from the rotation rate of or measured by motor 112 as measured by a sensor at the motor output or at the pump input. In other embodiments, the rotation rate of crankshaft 111 may be determined by a rotation sensor 129, which may be positioned to determine the number of revolutions of crankshaft 111, which may be used to determine the rotation rate of crankshaft 111. Rotation sensor 129 may include, without limitation, one or more of a hall sensor, optical sensor, mechanical sensor, encoder, or other useful sensor. Alternatively, the piston cycle rate may be determined using a mechanical switch or proximity switch or stroke counter that is mounted forward of the rotating assembly and gives an output based on linear rotation of the components. Clamp-on stroke counters are commercially available.

As mud pump 100 is operated, one or more of pistons 105, liners 109, crankshaft 111, connecting rod journals 113, connecting rods 115, suction valves 121, and discharge valves 125 may be degraded by, for example and without limitation, mechanical contact between a moving component and a nonmoving component. In some cases, the rate of degradation of these components may be affected by the total distance traveled by each piston 105 since the last refurbishment, referred to herein as the total piston travel; the pressure of drilling fluid discharged by mud pump 100, referred to herein as discharge pressure; or both. For example and without limitation, in some cases, pistons 105 may exert a higher force on liners 109 when discharge pressure is higher, resulting in a larger amount of degradation for a given total piston travel. Likewise, at a lower discharge pressure, a lower amount of degradation may occur for a given total piston travel.

The total piston travel may be calculated by determining an average piston velocity, denoted V, for a time period of interest. The rotation rate of crankshaft 111 or cycle rate of the piston, denoted R, may be used to determine an average piston velocity V between each piston 105 and liner 109. In some embodiments, the average piston velocity V may be determined according to the equation:

$$V = 2 \times L \times R$$

Multiplying the average piston velocity V by the discharge pressure, denoted P, for a given measurement of pressure and velocity may determine a pressure-velocity metric, referred to herein as a "PV" value, for the time of the sample according to:

$$PV = V \times P$$

In such an embodiment, PV may be proportional to both average piston velocity V and discharge pressure P in a linear equation as described above. In some embodiments, the equation for PV may include one or more higher-order terms or may be an equation other than a linear equation. In other embodiments, the equation may be selected from one of a preselected set of equations based on the current operating conditions. For example, in some embodiments, the PV calculation may include a multiplier when a preselected condition is encountered. For example, PV may include an additional multiplier when mud pump 100 is operating at an average piston velocity V above a preselected velocity threshold or when mud pump 100 is operating with a discharge pressure P above a preselected pressure threshold. In some embodiments, multiple equations may be selected between depending on the operating conditions. In some embodiments, the PV equation may be selected based on one or more drilling parameters, such as the type or composition of drilling fluid used with mud pump 100.

In some embodiments, the PV value may be used to determine or calculate a mud pump operational lifespan metric referring to the amount of mud pump operational lifespan expended in terms of total piston travel multiplied by the discharge pressure, defined as pressure-distance metric PD. For example, in some embodiments, the average PV for a preselected time period may be monitored and used to determine PD value for that time period (i). In such an embodiment, calculation of PD value for time period i is found by multiplying the average PV value measured for the preselected time period by the amount of time $t_i$ in the preselected time period:

$$PD_i = PV_i \times t_i$$

In some embodiments, the PD value may be expressed in terms of "PSI-miles" referring to the units of measure of the metric. For example and without limitation, when expressed in units of PSI-miles, discharge pressure P may be expressed in terms of pounds per square inch (PSI) and average piston velocity V may be measured in feet per minute. The calculated $PD_i$ may be converted from PSI-feet to PSI-miles by dividing by the number of feet in a mile, i.e. 5280 feet/mile.

In other embodiments, an integral may be taken for the time period rather than utilizing an average measurement. In some embodiments, the duration of the time period may be the interval between samples taken on pressure transducer 127 and rotation sensor 129, or may be a preselected, larger time period such as, for example and without limitation, one minute.

In some embodiments, the determined PD value for a given mud pump 100 may be accumulated during operation of mud pump 100. In some embodiments, the PD value calculated for each time interval may be summed to determine a total PD for the mud pump 100 that may reflect the amount of operational lifespan expended for the mud pump 100. In some embodiments, the total PD a mud pump 100 is expected to last before requiring refurbishment may be determined experimentally by, for example and without limitation, testing of a test mud pump until a preselected amount of degradation occurs. In other embodiments, the PD value may be determined based on a desired refurbishment schedule for mud pump 100 or may be based on a model of mud pump 100.

For example and without limitation, the total PD may be used to predict the expected mud pump operational lifespan expended for a given mud pump 100. Because drilling operations vary, the number of hours mud pump 100 has been used may not accurately predict the condition of and remaining life cycle of mud pump 100. FIG. 3A depicts exemplary mud pump operational lifespan remaining for a lightly used mud pump 100a and a mud pump operational lifespan remaining for a heavily used mud pump 100b, each of which is further defined herein below, over time compared with the mud pump operational lifespan remaining according to an hours-based metric (100c). In some embodiments, the use of total PD or PV instead of operating hours may allow an operator to determine that a lightly used mud pump 100a having a low total PD or PV despite a large number of operating hours, i.e. a mud pump that was used at a low speed, a low pressure, or both, may have more mud pump operational lifespan remaining than a metric based on expected operating hours would indicate. Thus, premature refurbishment of lightly used mud pump 100a may be avoided compared to an hours-based metric. Similarly, an operator may recognize that because a heavily used mud pump 100b has been used at higher rotation speed, higher pressure, or both, and therefore has a high total PD or PV, it may require earlier refurbishment than the accumulated operating hours may indicate. For example, as depicted in FIG. 3B, the total accumulated PV for heavily used mud pump 100b increases at a higher rate over time than the total accumulated PV for lightly used mud pump 100a, and therefore reaches preselected threshold PV value 211' that corresponds to preselected threshold PD value 211 as discussed below in fewer operation hours. As shown in FIG. 3C, the total accumulated PV for mud pump 100 may, in some embodiments, correspond linearly with the remaining operational lifespan such that remaining operational lifespan can be predicted or calculated based on total accumulated PV. Once preselected threshold PV value 211' is reached regardless of operation hours, refurbishment may be undertaken. Such refurbishment may, for example and without limitation, prevent undue damage to heavily used mud pump 100b or other components of a drilling rig caused by failure of heavily used mud pump 100b.

Figure 4:
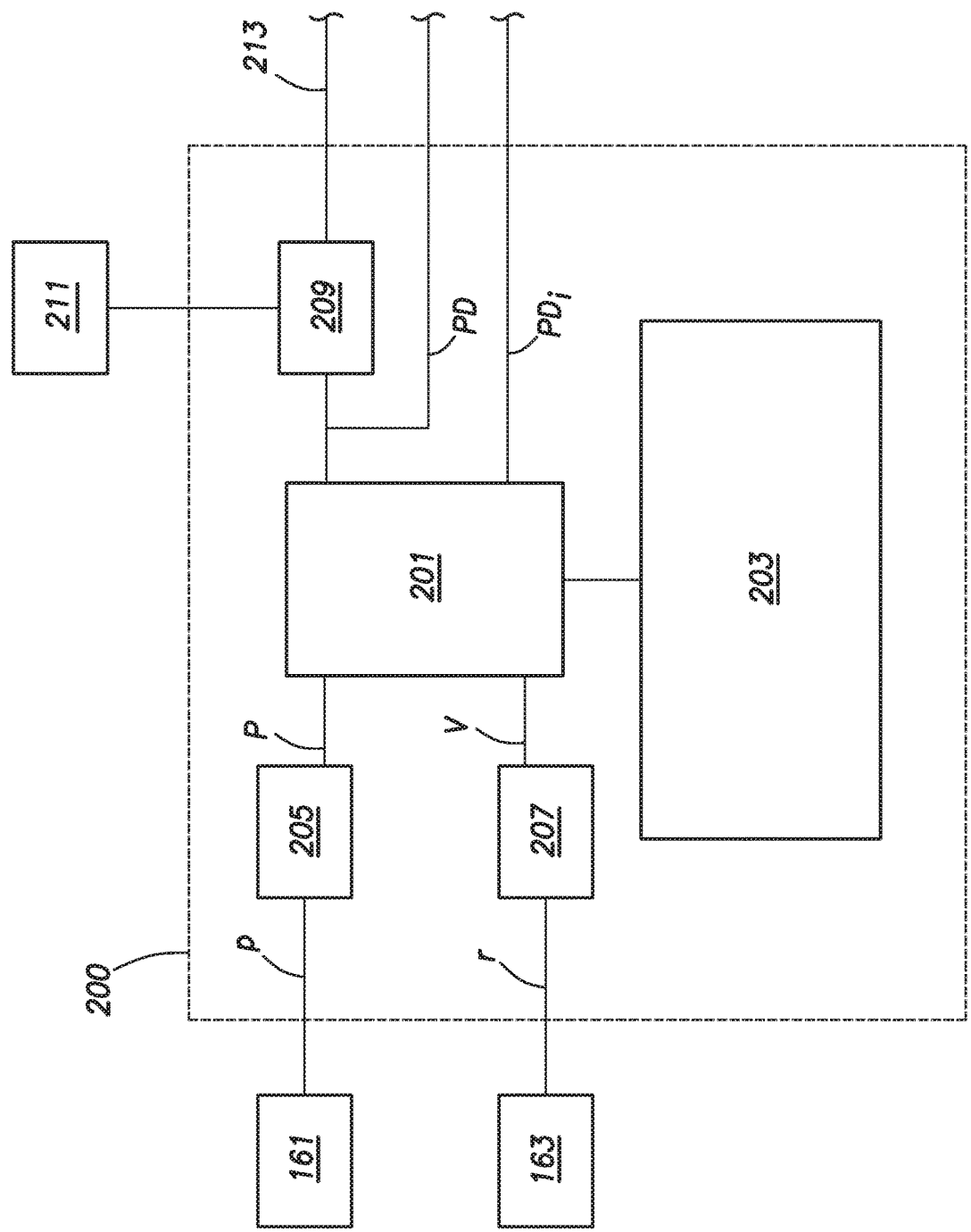
FIG. 4 depicts a schematic view of a measurement package consistent with at least one embodiment of the present disclosure.

In some embodiments, total PD calculation may be undertaken by measurement package 200. Measurement package 200 may, as depicted in FIG. 4, include processing module 201. Processing module 201 may include one or more of a microprocessor, microcontroller, processor, FPGA, or other logic modules. Measurement package 200 may include tangible, non-transitory, computer readable memory media module 203 that may, in some embodiments, store one or more readings or calculations as described further herein below as well as computer program instructions for carrying out one or more operations as described herein.

In some embodiments, measurement package 200 may include pressure signal receiver 205 and rotation signal receiver 207. Pressure signal receiver 205 and rotation signal receiver 207 may be operatively coupled by wire or wirelessly with pressure transducer 161 and rotation sensor 163 respectively. Pressure signal receiver 205 may receive a signal p from pressure transducer 127 indicative of the pressure in fluid outlet 123, and may output discharge pressure P. Rotation signal receiver 207 may receive a signal r from rotation sensor 129 indicative of the rotation rate of crankshaft 111, and may output average piston velocity V. In some embodiments, rotation sensor 129 may output a pulsed signal representing a rotation or partial rotation of crankshaft 111. Rotation signal receiver 207 may, in some embodiments, determine average piston velocity V from the pulsed signal as discussed herein above. P and V as output by pressure signal receiver 205 and rotation signal receiver 207 may be used by processing module 201 to calculate a PD value for a time period ($PD_i$) or a total PD value, either of which may be output from measurement package 200.

In some embodiments, measurement package 200 may include comparison module 209. Comparison module 209 may compare total PD value with preselected threshold PD value 211, and may output warning or alert signal 213. Warning or alert signal 213 may indicate that the calculated total PD value is above preselected threshold PD value 211, indicating, for example and without limitation, that mud pump 100 may be due for refurbishment.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A method comprising:
   operating a mud pump having a rotating shaft;
   measuring a cycle rate of the shaft of the mud pump;
   measuring a discharge pressure of the mud pump;
   calculating a total pressure-distance value based on the cycle rate and pressure;
   comparing the total pressure-distance value with a predetermined threshold pressure-distance value; and
   refurbishing the mud pump on the basis of the comparison of the total pressure-distance value with a predetermined threshold pressure-distance value.

2. The method of claim 1, wherein the calculation operation comprises:
   calculating an average pressure-velocity value for a predetermined time period;
   multiplying the average pressure-velocity value for the length of the predetermined time period to determine a pressure-distance value for the time period; and
   summing the pressure-distance values for each time period the mud pump is in operation to determine a total pressure-distance value.

3. The method of claim 2 wherein the pressure-velocity value is calculated according to:

$$PV = V \times P$$

wherein PV is the pressure-velocity value, V is average piston velocity, and P is discharge pressure.

4. The method of claim 3 wherein the mud pump comprises a piston and a liner, the piston in contact with the liner, the piston operably coupled to the crankshaft such that rotation of the crankshaft causes the piston to reciprocate within the liner, wherein operating the mud pump comprises rotating the crankshaft.

5. The method of claim 4 wherein refurbishing the mud pump comprises replacing the piston, liner, or both.

6. The method of claim 4 wherein the piston travels a stroke length L in each reciprocation, and wherein the average piston velocity V is calculated according to:

$$V = 2 \times L \times R$$

where R is a cycle rate of the crankshaft or the motor.

7. The method of claim 3 wherein V is determined in terms of feet per minute, P is determined in PSI, and wherein PD is determined in terms of PSI miles.

8. The method of claim 1 wherein the predetermined threshold pressure-distance value is determined by experimental testing of a test mud pump.

9. The method of claim 8 wherein the predetermined threshold pressure-distance value is determined based on the pressure-distance value of the test mud pump when a preselected amount of degradation occurs.

10. The method of claim 1 wherein the cycle rate is measured with a rotation sensor positioned on the crankshaft, the rotation sensor comprising a hall sensor, optical sensor, or mechanical sensor.

11. The method of claim 1 wherein the cycle rate is measured with a sensor positioned at a motor output or at a pump input.

12. The method of claim 1 wherein the discharge pressure is measured with a pressure transducer or strain gauges.

13. The method of claim 1 wherein the calculating operation is carried out by a measurement package, the measurement package comprising a processing module and a tangible, non-transitory computer readable memory media module.

14. The method of claim 13 wherein the measurement package further comprises a comparison module, wherein the comparing operation is carried out using the comparison module.

\* \* \* \* \*